United States Patent
Goel et al.

(10) Patent No.: US 11,520,680 B2
(45) Date of Patent: Dec. 6, 2022

(54) PREDICTING STATISTICS GATHERING TIMES FOR DATABASE ACTIVITY DATA USING MACHINE LEARNING TECHNIQUES

(71) Applicant: Dell Products L.P., Round Rock, TX (US)

(72) Inventors: Akanksha Goel, Faridabad (IN); Selvaraj Subbaian, Coimbatore (IN); Geetha Venkatesan, Bangalore (IN); Debashish Sahu, Sundargarh (IN)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 17/146,883

(22) Filed: Jan. 12, 2021

(65) Prior Publication Data

US 2022/0222166 A1 Jul. 14, 2022

(51) Int. Cl.
*G06F 11/34* (2006.01)
*G06N 20/00* (2019.01)
*G06F 11/30* (2006.01)

(52) U.S. Cl.
CPC ...... *G06F 11/3452* (2013.01); *G06F 11/3034* (2013.01); *G06F 11/3447* (2013.01); *G06F 11/3476* (2013.01); *G06N 20/00* (2019.01); *G06F 2201/835* (2013.01)

(58) Field of Classification Search
CPC ............ G06F 11/3452; G06F 11/3447; G06F 11/3476; G06F 11/3034; G06F 16/24545; G06F 11/3089
See application file for complete search history.

(56) References Cited

U.S. PATENT DOCUMENTS

| | | | |
|---|---|---|---|
| 8,700,602 B2 | 4/2014 | Schapker et al. | |
| 9,582,525 B2 | 2/2017 | Idicula et al. | |
| 11,379,444 B1* | 7/2022 | Wang | G06F 16/2365 |
| 2008/0133454 A1* | 6/2008 | Markl | G06F 16/24539 |
| 2020/0356462 A1* | 11/2020 | Anand | G06F 11/3495 |
| 2021/0028969 A1* | 1/2021 | Li | H04L 43/024 |
| 2021/0089508 A1* | 3/2021 | Laskawiec | G06F 16/215 |

* cited by examiner

*Primary Examiner* — Yolanda L Wilson
(74) *Attorney, Agent, or Firm* — Ryan, Mason & Lewis, LLP (57) ABSTRACT

Methods, apparatus, and processor-readable storage media for predicting statistics gathering times for database activity data using machine learning techniques are provided herein. An example computer-implemented method includes obtaining activity data pertaining to at least one storage object of a given database; determining one or more times to gather statistics related to activity data pertaining to the at least one storage object of the given database by processing at least a portion of the obtained activity data using one or more machine learning techniques; and performing at least one automated action related to statistics gathering based at least in part on the one or more determined times.

20 Claims, 8 Drawing Sheets

In:
```python
def data_preprocess(df, label):
    """
    Creates extra time series features from datetime index.
    """
    df = df.copy()
    df['date']=df['timestamp'].dt.date
    df['hour'] = df['timestamp'].dt.hour
    df['dayofweek'] = df['timestamp'].dt.dayofweek
    df['quarter'] = df['timestamp'].dt.quarter
    df['month'] = df['timestamp'].dt.month
    df['year'] = df['timestamp'].dt.year
    df['dayofyear'] = df['timestamp'].dt.dayofyear
    df['dayofmonth'] = df['timestamp'].dt.day
    df['weekofyear'] = df['timestamp'].dt.weekofyear X = df[['table_name', 'timestamp', 'hour', 'date', 'dayofweek', 'quarter', 'month', 'year',
            'dayofyear', 'dayofmonth', 'weekofyear', label]]
    return X datacoll=df[['table_name', 'timestamp', 'no_of_dml_operations']]
datacoll['timestamp']=pd.to_datetime(df['timestamp'], format="%Y-%m-%d %H")
dfcp1 = data_preprocess(datacoll, 'no_of_dml_operations')
dfcoll.head(23)
```

Out:

| | table_name | timestamp | hour | date | dayofweek | quarter | month | year | dayofyear | dayofmonth | weekofyear | no_of_dml_operations |
|---|---|---|---|---|---|---|---|---|---|---|---|---|
| 0 | in_category_coll | 2020-03-09 02:00:00 | 2 | 2020-03-09 | 0 | 1 | 3 | 2020 | 69 | 9 | 11 | 2611 |
| 1 | in_category_coll | 2020-03-09 03:00:00 | 3 | 2020-03-09 | 0 | 1 | 3 | 2020 | 69 | 9 | 11 | 4948 |
| 2 | in_category_coll | 2020-03-09 04:00:00 | 4 | 2020-03-09 | 0 | 1 | 3 | 2020 | 69 | 9 | 11 | 37729 |
| 3 | in_category_coll | 2020-03-09 05:00:00 | 5 | 2020-03-09 | 0 | 1 | 3 | 2020 | 69 | 9 | 11 | 34466 |
| 4 | in_category_coll | 2020-03-09 06:00:00 | 6 | 2020-03-09 | 0 | 1 | 3 | 2020 | 69 | 9 | 11 | 10136 |
| 5 | in_category_coll | 2020-03-09 07:00:00 | 7 | 2020-03-09 | 0 | 1 | 3 | 2020 | 69 | 9 | 11 | 8756 |
| 6 | in_category_coll | 2020-03-09 08:00:00 | 8 | 2020-03-09 | 0 | 1 | 3 | 2020 | 69 | 9 | 11 | 3894 |
| 7 | in_category_coll | 2020-03-09 09:00:00 | 9 | 2020-03-09 | 0 | 1 | 3 | 2020 | 69 | 9 | 11 | 2854 |
| 8 | in_category_coll | 2020-03-09 10:00:00 | 10 | 2020-03-09 | 0 | 1 | 3 | 2020 | 69 | 9 | 11 | 4103 |

FIG. 4

```
In:  rolmean = hourly_operation_series.rolling(6) .mean()
     rolstd = hourly_operation_series.rolling(6) .std()

#Plot rolling statistics:
     orig = plt.plot(hourly_operation_series, color='blue', label='Original')
     mean = plt.plot(rolmean, color='red', label='Rolling Mean')
     std = plt.plot(rolstd, color='black', label = 'Rolling Std')
     plt.legend(loc='best')
     plt.title('Rolling Mean & Standard Deviation')
     plt.xticks(rotation=90)
     plt.show(block=False)
```

FIG. 5

```
In:  plot_acf(hourly_operation_series_diff2)
     pyplot.show()

plot_pacf(hourly_operation_series_diff2)
     pyplot.show()
```

PREDICTING STATISTICS GATHERING TIMES FOR DATABASE ACTIVITY DATA USING MACHINE LEARNING TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for database management using such systems.

BACKGROUND

Many applications rely on obtaining data by executing programming language statements in a database. In such a scenario, a component commonly referred to as an optimizer examines one or more possible execution plans for a given programming language statement and selects the execution plan to be carried out on the basis of one or more parameters. To determine a cost related to such actions, the optimizer generally requires considerable information about storage objects (e.g., tables, indexes, etc.) which are to be accessed in connection with the given programming language statement. As such, optimizer statistics typically refer to data that describe a particular database and the storage objects therein. An optimizer uses such statistics to select an execution plan for each programming language statement to access requested data. Accordingly, being able to gather appropriate statistics in a timely manner is critical to maintaining acceptable performance on any database system.

Stale (i.e., out-of-date) statistics can mislead an optimizer and, in some cases, result in selection of a sub-optimal execution plan. However, conventional database management techniques present problems related to stale statistics by using time-intensive and resource-intensive methods. Such conventional database management techniques include, for example, manual intervention on an ad hoc basis, as well as static scheduled statistics gathering during periods of maintenance. As such techniques are based on potentially sporadic and/or infrequent statistics gathering, or a relatively infrequent (e.g., daily) fixed runtime for gathering statistics, such techniques can result in inadequate statistics gathering for certain storage objects. Moreover, determining when to gather statistics might differ from one storage object to another, as transactions may occur at different times and/or in different time zones. In contrast, conventional solutions that include running statistics gathering continuously consume computing resources and negatively impact the performance of one or more other operations associated with the given database and/or corresponding system(s).

SUMMARY

Illustrative embodiments of the disclosure provide techniques for predicting statistics gathering times for database activity data using machine learning techniques. An exemplary computer-implemented method includes obtaining activity data pertaining to at least one storage object of a given database, and determining one or more times to gather statistics related to activity data pertaining to the at least one storage object of the given database by processing at least a portion of the obtained activity data using one or more machine learning techniques. Additionally, the method includes performing at least one automated action related to statistics gathering based at least in part on the one or more determined times.

Illustrative embodiments can provide significant advantages relative to conventional database management techniques. For example, problems associated with stale statistics as well as time-intensive and resource-intensive methods are overcome in one or more embodiments through automatically predicting statistics gathering times for database object activity data using machine learning techniques.

These and other illustrative embodiments described herein include, without limitation, methods, apparatus, systems, and computer program products comprising processor-readable storage media.

BRIEF DESCRIPTION OF THE DRAWINGS

FIG. 3 shows an example code snippet for data preprocessing in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
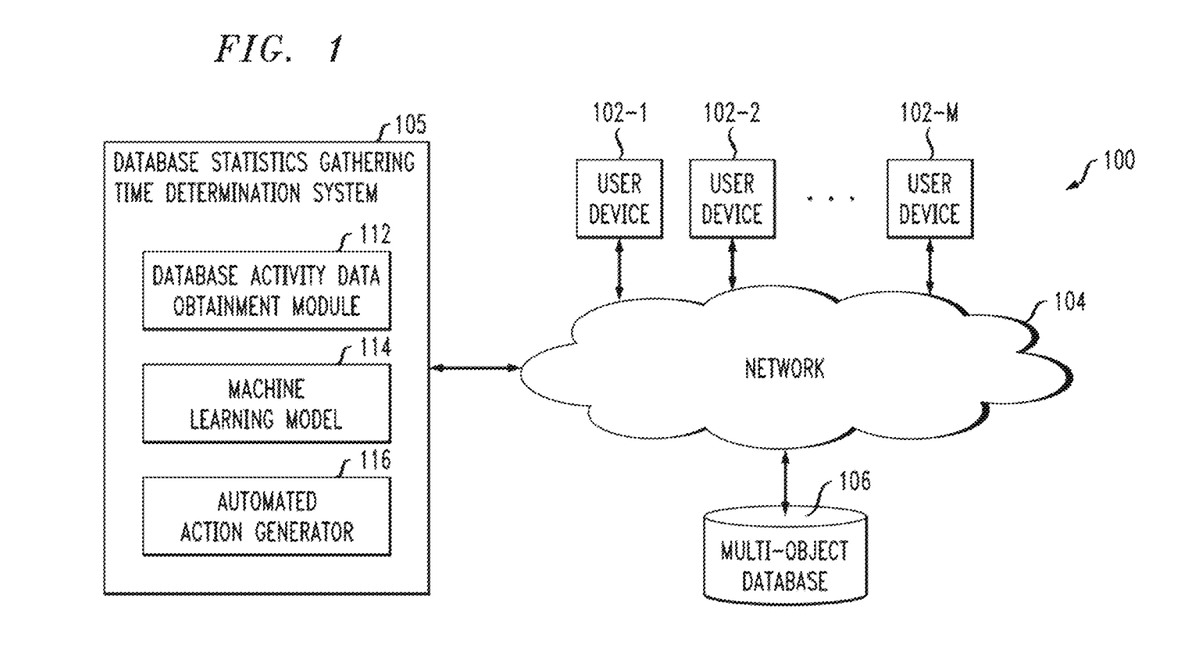
FIG. 1 shows an information processing system configured for predicting statistics gathering times for database activity data using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, ... 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is database statistics gathering time determination system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, database statistics gathering time determination system 105 can have an associated multi-object database 106 configured to store data pertaining to activity on the objects of a given database, which comprise, for example, activity data related to merge operations, insert operations, delete operations, and update operations.

The database 106 in the present embodiment is implemented using one or more storage systems associated with database statistics gathering time determination system 105. Such storage systems can comprise one or more of a variety of different types of storage including network-attached storage (NAS), storage area networks (SANs), direct-attached storage (DAS) and distributed DAS, as well as combinations of these and other storage types.

Also associated with database statistics gathering time determination system 105 can be one or more input-output devices, which illustratively comprise keyboards, displays or other types of input-output devices in any combination. Such input-output devices can be used, for example, to support one or more user interfaces to database statistics gathering time determination system 105, as well as to support communication between database statistics gathering time determination system 105 and other related systems and devices not explicitly shown.

Additionally, database statistics gathering time determination system 105 in the FIG. 1 embodiment is assumed to be implemented using at least one processing device. Each such processing device generally comprises at least one processor and an associated memory, and implements one or more functional modules for controlling certain features of database statistics gathering time determination system 105.

More particularly, database statistics gathering time determination system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSIs), and should therefore not be viewed as limited in any way to spinning magnetic media.

The network interface allows database statistics gathering time determination system 105 to communicate over the network 104 with the user devices 102, and illustratively comprises one or more conventional transceivers.

The database statistics gathering time determination system 105 further comprises database activity data obtainment module 112, machine learning model 114, and automated action generator 116.

It is to be appreciated that this particular arrangement of modules 112, 114 and 116 illustrated in database statistics gathering time determination system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for predicting statistics gathering times for database activity data using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, portions of database statistics gathering time determination system 105 and multi-object database 106 can be on and/or part of the same processing platform (such as, for example, depicted in FIG. 2).

An exemplary process utilizing modules 112, 114 and 116 of an example database statistics gathering time determination system 105 in computer network 100 will be described in more detail with reference to the flow diagram of FIG. 8.

Accordingly, at least one embodiment includes predicting statistics gathering times for database activity data using machine learning techniques. Such an embodiment includes determining and/or predicting one or more ideal times for statistics gathering by analyzing the behavioral pattern(s) of data manipulation language (DML) activity on one or more database storage objects (also referred to herein simply as "objects") for at least one optimizer to obtain an optimal execution plan. Using machine learning techniques, such analysis can be based at least in part on the size of database objects in addition to DML activity with respect to different objects. As such, one or more embodiments include providing automation for schema object statistics gathering, enabling one or more database optimizers to provide improved and/or optimal query plans to programming language statements (e.g., SQL statements), resulting in improvements to system performance.

Figure 2:
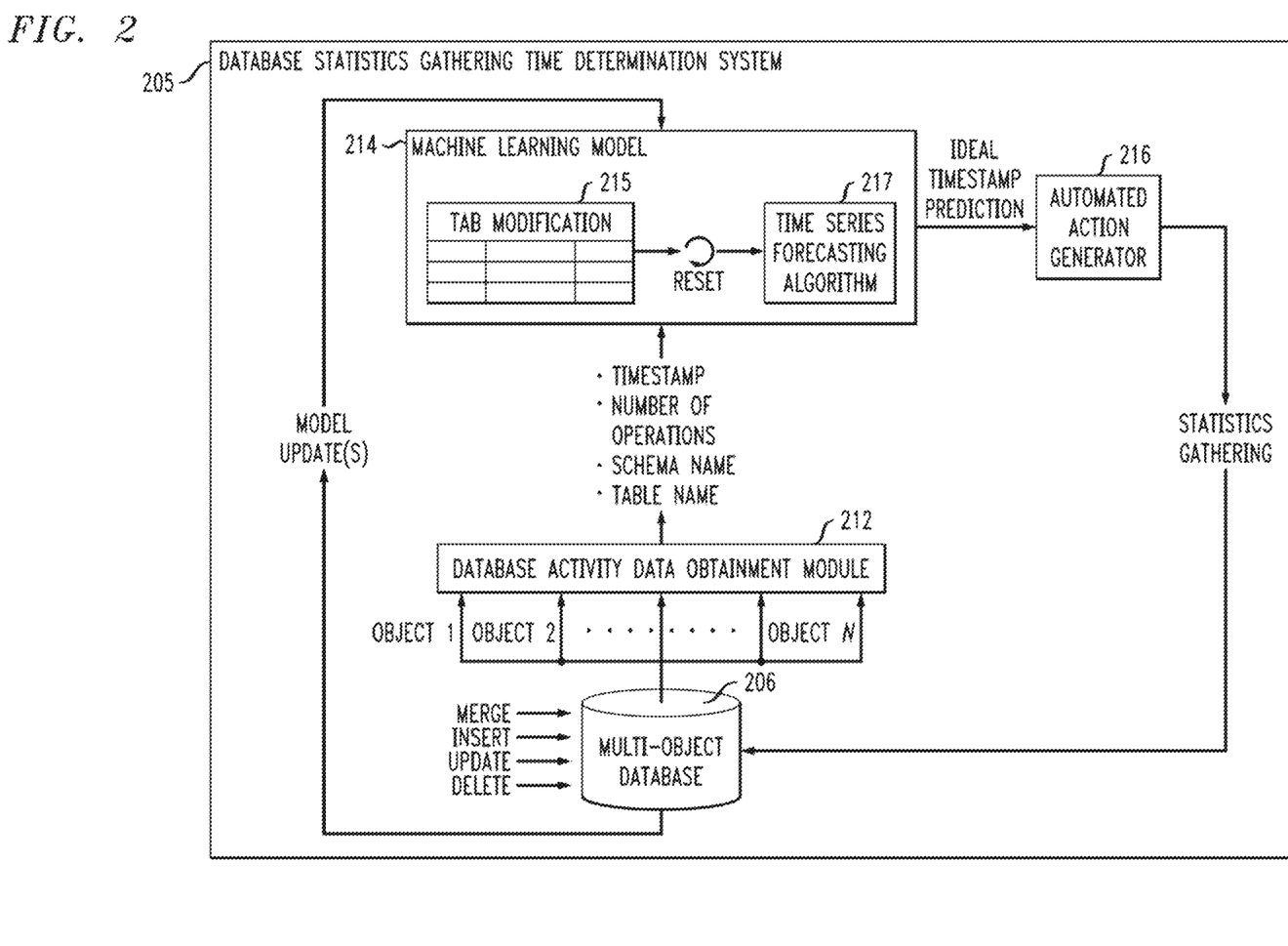
FIG. 2 shows an example end-to-end workflow in an illustrative embodiment.

FIG. 2 shows an example end-to-end workflow in an illustrative embodiment. By way of illustration, FIG. 2 depicts an example embodiment wherein, within database statistics gathering time determination system 205, dynamic and/or real-time streaming of data (e.g., DML operations such as merge operations, insert operations, update operations, and delete operations) is carried out using event capture methodology via database activity data obtainment module 212 that reads from redo logs generated at the time of any DML activity on different objects in database 206. Leveraging at least a portion of such data (e.g., timestamps, number of DML operations, schema name(s), table name(s), etc.), machine learning model 214 is trained, and hence thereafter, statistics are collected at the determined/proposed ideal time(s) considering at least objects that have reached an identified stale percentage. An internal table (i.e., tab modification table) 215, which is maintained in at least one virtual machine (VM), is updated for status, and hence thereafter, the machine learning model 214 utilizes this information to reset the model 214 once statistics are up-to-date (e.g., stating a 0% stale percentage).

In at least one embodiment, the machine learning model 214 is built on the concept that the optimal time for running statistics gathering on a given database object would be when DML activity is minimal on the database object. Such a machine learning model 214, using at least one time series forecasting algorithm 217, analyzes the behavior of DML activity for different objects happening at each of multiple timestamps. Accordingly, as depicted in FIG. 2, machine learning model 214 generates and outputs, to automated action generator 216, a prediction of an ideal time for statistics gathering, and execution of such statistics gathering is initiated (based at least in part on the prediction) by automated action generator 216 in connection with database 206. Feedback and/or other inputs from database 206 can additionally be used to further train and/or update machine learning model 214.

Additionally or alternatively, one or more embodiments include dynamically defining at least one stale data percentage for one or more objects in a given database. When tables are frequently and/or regularly modified, at least one embodiment includes enabling the gathering of statistics often enough such that the database data do not go stale, but not so often that collection overhead degrades system performance. Moreover, if there is a sudden surge in database transactions, such an embodiment can include dynamically learning of such a surge, and rescheduling statistics collection to the next best time. As further detailed herein, in such an embodiment, a machine learning model (e.g., machine learning model 214) learns from data provided by an event capture methodology (e.g., via database activity data obtainment module 212) to a custom tab modification table (e.g., tab modification table 215).

Event capture methodology implemented via one or more embodiments allows for dynamic and/or real-time streaming of metadata at one or more points in time from at least one database. Such event capture methodology allows for reading of redo logs and identifying the number of DML operations occurring in real-time on different objects within the at least one database without querying for a tab modification table. Using such methodology, at least one machine learning model can leverage such data and predict at least one related stale percentage as well as at least one optimal time to run at least one statistics gathering operation on at least a portion of the at least one database.

In one or more embodiments (e.g., such as the example embodiment depicted in FIG. 2), a machine learning model utilized can include using time series modelling to forecast the number of DML operations at future time instances. Such an embodiment can also include dataset preprocessing. By way of example, in such an embodiment, at least one dynamic and/or real-time dataset for DML operations is fetched at at least one point in time with the help of event capture methodology for multiple different objects in a given database. Data instances can be acquired, for example, for the following features: timestamp (e.g., hourly timestamp for the day (YYYY-mm-ddHH24), number of DML operations (e.g., number of DML operations happening at a given hour of the day), and object name (e.g., table name of the object).

FIG. 3 shows an example code snippet for data preprocessing in an illustrative embodiment. In this embodiment, example code snippet 300 is executed by or under the control of at least one processing system and/or device. For example, the example code snippet 300 may be viewed as comprising a portion of a software implementation of at least part of database statistics gathering time determination system 105 of the FIG. 1 embodiment.

In one or more embodiments, and in connection with example code snippet 300, a model can roll-up from a minute scale to an hourly roll-up. Accordingly, example code snippet 300 illustrates and example of using hourly timestamp information to generate multiple features, which are then used in at least one algorithm to analyze DML activity on objects at different regional times.

In such an example embodiment, various patterns can be understood by adding features and observing a first plot (e.g., the number of DML operations versus the hours of the day) wherein DML activity increases for later hours of the day. Similarly, patterns can also be observed using a second plot wherein Friday has the least DML activity among days of the week. Accordingly, such example plots facilitate understanding patterns of DML activity for a particular object with respect to time.

As also noted in example code snippet 300, data instances can include a set of features as well as one or more prediction labels including, for example, timestamps (e.g., hourly timestamp for the day (YYYY-mm-ddHH24), schema name for the object, table name of the object, hour of the day, day of the week, quarter of the year, day of the year, day of the month, week of the year, percentage change in the number of DML operations (e.g., cumulative of number of DML operations for each hour since the last time statistics were gathered relative to the total number of DML operations occurred on the object), and the number of DML operations (e.g., the number of DML operations happening at a given hour of the day).

It is to be appreciated that the particular example code snippet depicted in FIG. 3 shows just one example implementation of data preprocessing, and alternative implementations of the process can be used in other embodiments.

Figure 4:
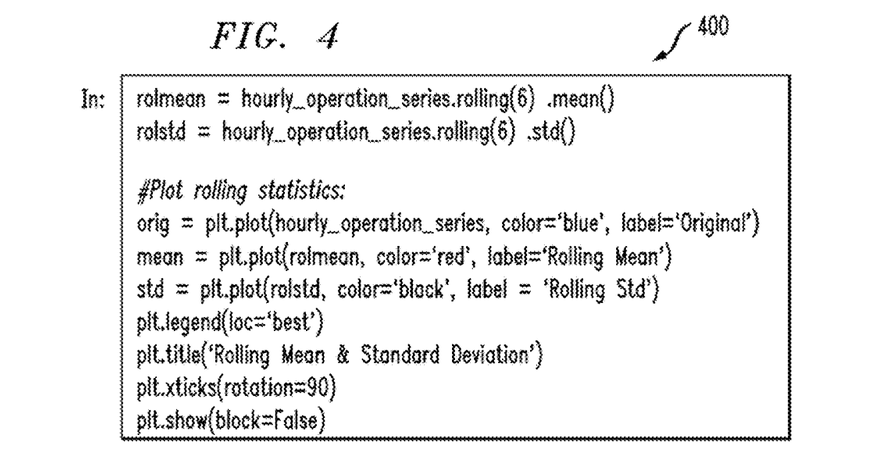
FIG. 4 shows an example code snippet for implementing rolling mean and standard deviation in an illustrative embodiment.

FIG. 4 shows an example code snippet for implementing rolling mean and standard deviation in an illustrative embodiment. In this embodiment, example code snippet 400 is executed by or under the control of at least one processing system and/or device. For example, the example code snippet 400 may be viewed as comprising a portion of a software implementation of at least part of database statistics gathering time determination system 105 of the FIG. 1 embodiment.

In connection with one or more embodiments, it can be assumed that if a time series has a certain behavioral pattern over time, there is a high probability that a similar pattern will be followed in at least one future time period. Additionally, and as illustrated in example code snippet 400 of FIG. 4, a rolling mean and standard deviation of window=6 can be used to check the stationarity of data instances. Also, in such an example embodiment, techniques for first order differencing and second order differencing can be used to make the dataset stationary. Therefore, in such an embodiment, order of differencing (d) is considered as 2 for an autoregressive integrated moving average (ARIMA) model (e.g., an ARIMA(1, 2, 1) model).

It is to be appreciated that this particular example code snippet shows just one example implementation of rolling mean and standard deviation, and alternative implementations of the process can be used in other embodiments.

Figure 5:
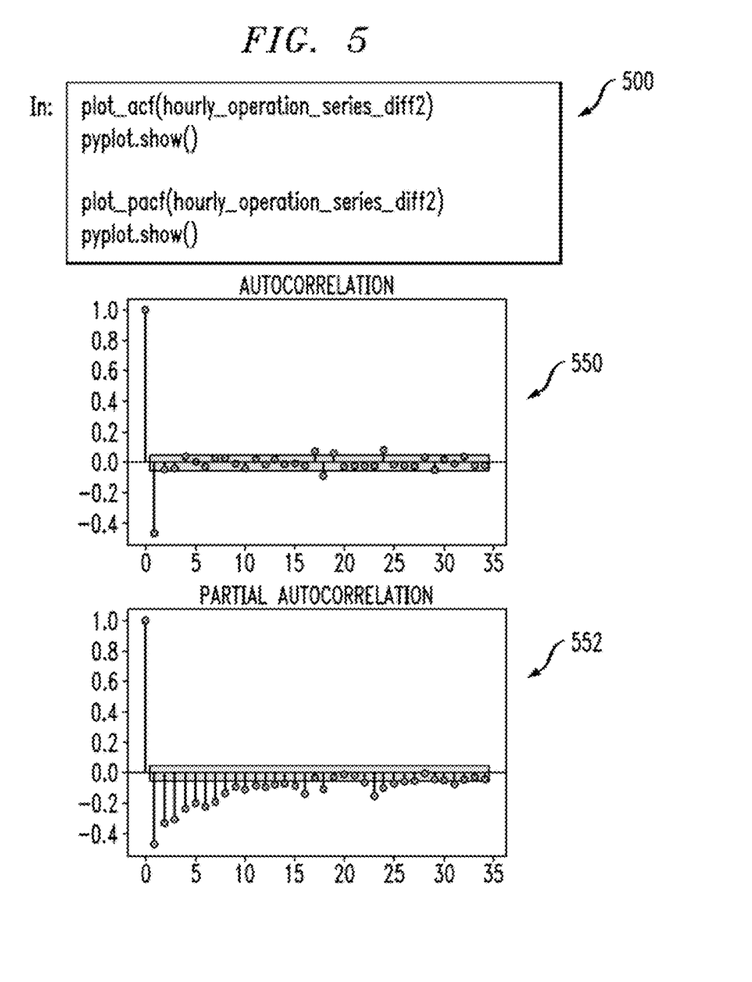
FIG. 5 shows an example code snippet for implementing autocorrelation plots (ACF) and partial autocorrelation (PACF) plots in an illustrative embodiment.

FIG. 5 shows an example code snippet for implementing ACF plots and PACF plots in an illustrative embodiment. In this embodiment, example code snippet 500 is executed by or under the control of at least one processing system and/or device. For example, the example code snippet 500 may be viewed as comprising a portion of a software implementation of at least part of database statistics gathering time determination system 105 of the FIG. 1 embodiment.

The example code snippet 500 illustrates, after implementing rolling mean and standard deviation, using ACF plots and PACF plots to determine various parameters in furtherance of providing a suitable ARIMA (p, d, q) model, wherein p represents the number of autoregressive terms, d represents the number of non-seasonal differences needed for stationarity, and q represents the number of lagged forecast errors in the prediction equation. By way of example, and as also illustrated in FIG. 5. ACF plot 550 and PACF plot 552 can include confidence band intervals (e.g., a 95% confidence interval band), indicating that any value outside such an area represents a statistically significant correlation. Accordingly, if, for example, a significant spike is observed at lag (x) in an ACF plot 550, that can assist in determining moving-average (MA) terms (q), and if a significant spike is observed in a PACF plot 552, that can assist in determining autoregressive (AR) terms (p).

It is to be appreciated that this particular example code snippet shows just one example implementation of providing parameters suitable for an ARIMA model using ACF plots and PACF plots, and alternative implementations of the process can be used in other embodiments.

In connection with at least one embodiment, one or more algorithms can be used to determine a model for time series forecasting. One such algorithm includes a Prophet model, which can include features including hourly timestamps (=ds), and labels directed to the number of DML operations (=y).

Figure 6:
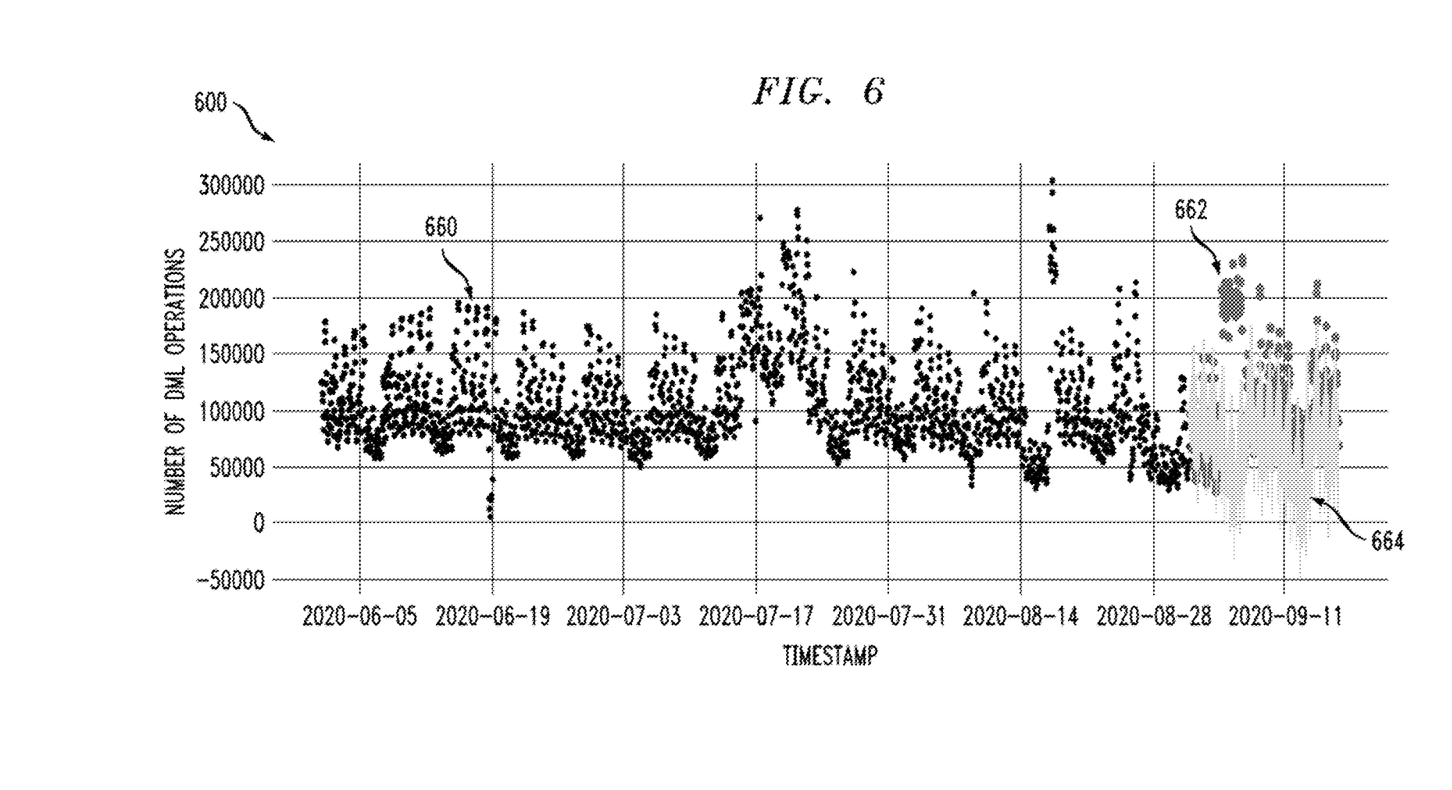
FIG. 6 shows an example scatter plot generated in connection with implementation of a Prophet model in an illustrative embodiment.

FIG. 6 shows an example scatter plot generated in connection with implementation of a Prophet model in an illustrative embodiment. In generating a prediction using a Prophet model (as illustrated in the FIG. 6 example), a scatter plot 600 can be generated wherein certain dots 660 represent the rolled-up number of DML operations (dml_ops) for each hourly timestamp which is used as a training dataset for the model. Other dots 662 can indicate the actual dml_ops, which is used as testing data for model input, and still other dots 664 can indicate predicted dml_ops occurring on the chosen object.

Another such algorithm includes an XgBoost model, which can include features including timestamps such as, for example, hourly timestamps for the day (YYYY-mm-ddHH24), schema name (e.g., schema name for the given object), table name (e.g., table name of the given object), hour (e.g., hour of the day), day of the week, quarter of the year, day of the year, day of the month, week of the year, and/or percentage change in the number of DML operations (e.g., the cumulative number of DML operations for each hour since the last time statistics were gathered relative to the total number of DML operations occurred on the object). Also, labels for such a model can be directed to the number of DML operations (=y).

In generating a prediction using an XgBoost model, consider an example use case wherein data instances from Jun. 1, 2020-Sep. 16, 2020 are considered as a training dataset for the XgBoost model. In such an example representation, a given line can represent the testing dataset and a separate line can represent predicted data points with respect to the testing dataset.

Yet another such algorithm includes an ARIMA model, which can include features including hourly timestamps (=x), and labels directed to the number of DML operations (=y). In generating a prediction using an ARIMA model, the actual number of DML operations at each hour timestamp can be used as a testing dataset represented by a given line, and can be, for example, almost overlapped by the predicted number of DML operations (represented by a separate line).

Using a forecasting model such as detailed herein (e.g., an ARIMA model), at least one embodiment includes predicting the number of DML operations for at least one future time period (e.g., future hourly timestamps of one or more 24-hour cycles) which is configurable depending, for example, on the nature of the database transaction(s). Additionally, one or more embodiments can include using the predicted DML operations as input for a subsequent step of identifying and/or determining at least one stale data percentage.

In determining stale data percentages, at least one embodiment includes feature scaling carried out using one or more min-max normalization techniques on the above-noted predicted number of DML operations (e.g., the predicted number of DML operations happening at each hour timestamp for a 24-hour cycle), resulting, for example, in a given range of values (e.g., a range of 0-100). Based at least in part on such feature scaling, one or more embodiments include determining a percentage cumulative change of predicted number of DML operations, for example, by calculating the cumulative number of predicted number of DML operations for each hour since the last time statistics were gathered, relative to the total number of DML operations that occurred on the object in question.

Additionally, in one or more embodiments, a plot is built using normalized predicted values for the number of DML operations and the determined percentage cumulative change in predicted number of DML operations. As used herein, a stale percentage can refer to the intersection point of the percentage cumulative change in predicted number of DML operations and the normalized predicted number of DML operations for an object. Such a concept is based at least in part on the understanding that objects are considered stale for a time period wherein there is limited DML activity.

Figure 7:
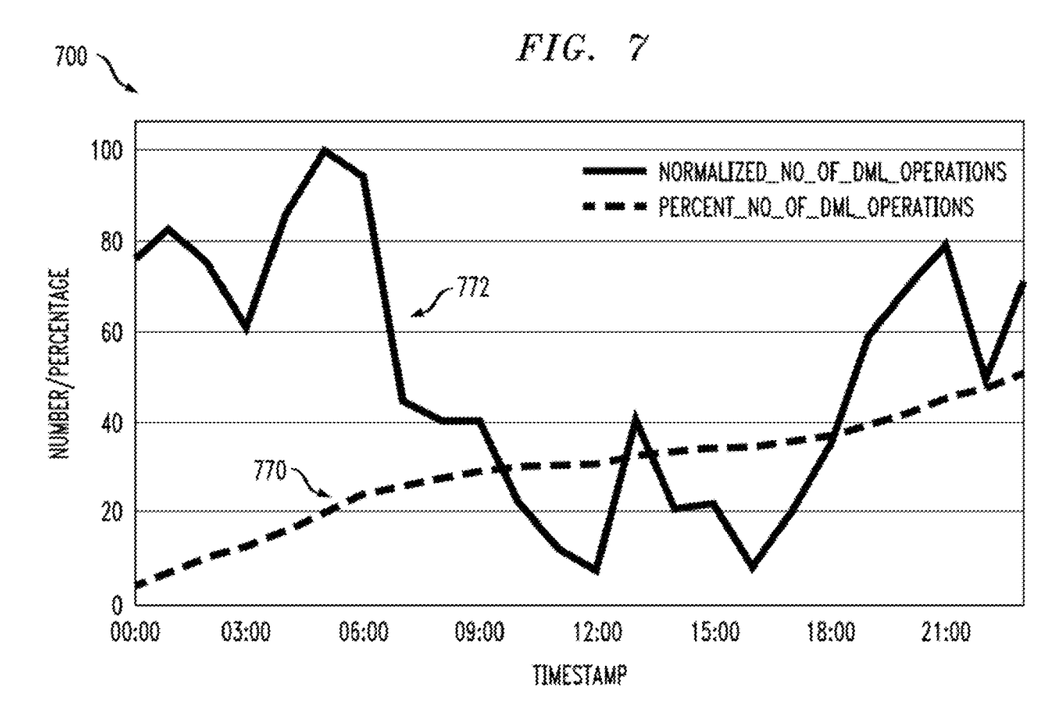
FIG. 7 shows an example predicted operations values plot generated in connection with an illustrative embodiment.

Therefore, in one or more example embodiments, and as depicted in FIG. 7, which shows an example predicted operations values plot 700 generated in connection with an illustrative embodiment, a subset of data points (for example, as depicted via line 772) which fall below a given line 770 on the plot 700 are considered in connection with determining the most ideal point (in time) for statistics gathering. For example, from this subset of data points, the point at which the number of DML operations is at or near a minimum value can be identified and/or targeted for gathering statistics.

By way merely of example and illustration, consider the example use case depicted in FIG. 7, wherein the stale percentage is 27% and the time period between 9:00 AM and 1:00 PM represents the first dip in the number of DML operations. Therefore, in such an example use case, 12:00 PM can be predicted as an ideal and/or optimal time for statistics gathering. However, further assume that there is sudden surge in the number of DML operations at this time (i.e., 12:00 PM). In such a scenario, a different time slot (e.g., the next best time slot) can be suggested for statistics gathering. Additionally, as soon as a statistics gathering operation completes, the proposed machine learning model used in connection with one or more embodiments can be reset to predict the next best time slot for statistics gathering in the next temporal cycle (e.g., the next 24-hour cycle).

As detailed herein, output generated by one or more embodiments can be used, for example, by at least one database administrator and/or at least one engineering team to run statistics gathering on stale database objects in an intelligent manner, allowing proper utilization of resources and improved performance in the database and/or corresponding system(s).

Figure 8:
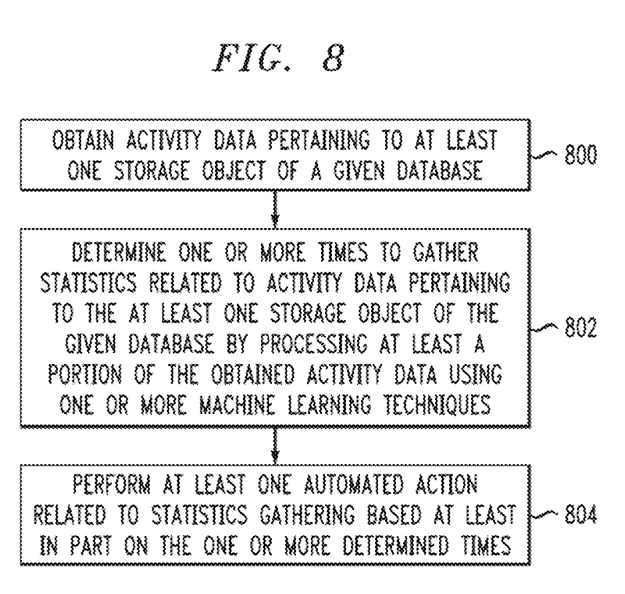
FIG. 8 is a flow diagram of a process for predicting statistics gathering times for database activity data using machine learning techniques in an illustrative embodiment.

FIG. 8 is a flow diagram of a process for predicting statistics gathering times for database activity data using machine learning techniques in an illustrative embodiment. It is to be understood that this particular process is only an example, and additional or alternative processes can be carried out in other embodiments.

In this embodiment, the process includes steps 800 through 804. These steps are assumed to be performed by database statistics gathering time determination system 105 utilizing its modules 112, 114 and 116.

Step 800 includes obtaining activity data pertaining to at least one storage object of a given database. In one or more embodiments, obtaining activity data includes obtaining data pertaining to data manipulation language activity on the at least one storage object of the given database.

Step 802 includes determining one or more times to gather statistics related to activity data pertaining to the at least one storage object of the given database by processing at least a portion of the obtained activity data using one or more machine learning techniques (e.g., one or more time series forecasting models such as a Prophet model, an XgBoost model, and/or an ARIMA model). In at least one embodiment, determining the one or more times to gather statistics includes dynamically identifying a percentage of stale data for the at least one storage object, wherein dynamically identifying the percentage of stale data includes predicting an amount of activity data on the at least one storage object for a future time period of a given length, and normalizing the predicted amount of activity data by performing machine learning-based feature scaling on the predicted amount of activity data using one or more min-max normalization techniques. Also, such an embodiment can include determining a percentage change of the normalized predicted amount of activity data relative to a total amount of activity data having previously occurred on the at least one storage object for a past time period of the given length, and dynamically identifying the percentage of stale data based at least in part on the determined percentage change and the normalized predicted amount of activity data.

Additionally or alternatively, in one or more embodiments, processing at least a portion of the obtained activity data using one or more machine learning techniques includes processing the at least a portion of the obtained activity data using an autoregressive integrated moving average model which includes one or more features comprising timestamp values and one or more labels comprising number of activity data items, and wherein using the autoregressive integrated moving average model includes using past numbers of activity data items considered in accordance with the timestamp values as a testing dataset, and forecasting a number of activity data items for at least one future time period in accordance with the timestamp values, the forecasting based at least in part on one or more types of activity associated with the activity data items for the at least one storage object. Also, in one or more embodiments, processing the at least a portion of the obtained activity data can be based at least in part on size of the at least one storage object and activity data pertaining to the at least one storage object relative to one or more additional storage objects.

Step 804 includes performing at least one automated action related to statistics gathering based at least in part on the one or more determined times. In at least one embodiment, performing the at least one automated action includes automating statistics gathering associated with the at least one storage object in accordance with the one or more determined times. Additionally or alternatively, performing the at least one automated action includes outputting the one or more determined times to at least one optimizer component associated with the given database for use in execution planning in connection with one or more programming language queries.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine ideal statistics gathering times for database activity data using machine learning techniques. These and other embodiments can effectively overcome problems associated with stale statistics as well as time-intensive and resource-intensive methods.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
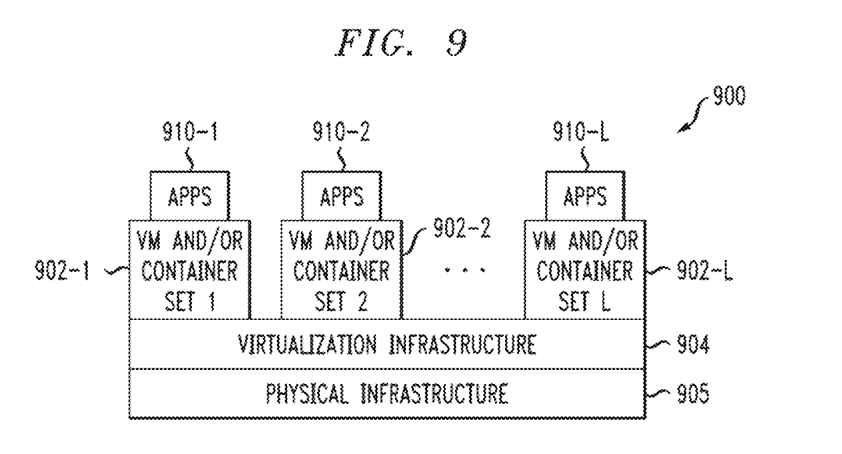
FIGS. 9 and 10 show examples of processing platforms that may be utilized to implement at least a portion of an information processing system in illustrative embodiments.
Figure 10:
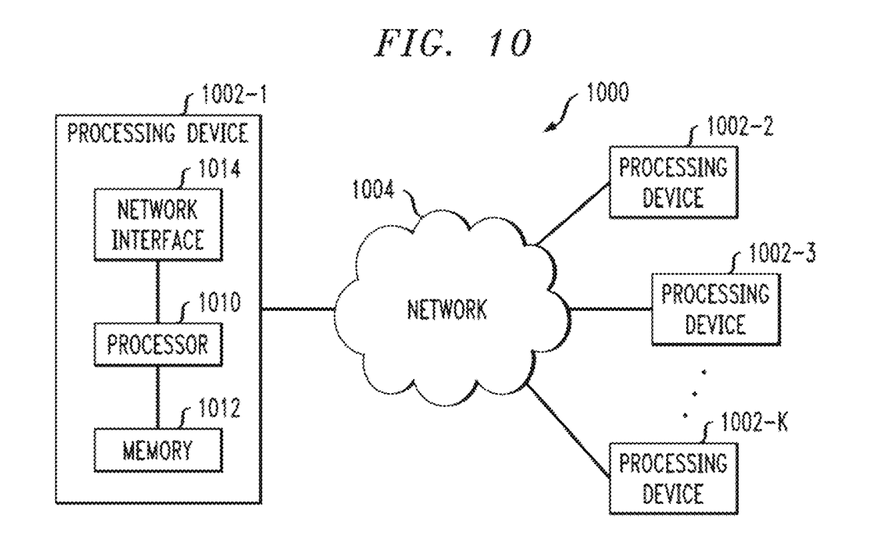

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple VMs and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-IL running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an application-specific integrated circuit (ASIC), a field-programmable gate array (FPGA) or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining activity data pertaining to at least one storage object of a given database;
determining one or more times to gather statistics related to activity data pertaining to the at least one storage object of the given database by processing at least a portion of the obtained activity data using one or more machine learning techniques; and
performing at least one automated action related to statistics gathering based at least in part on the one or more determined times, wherein performing at least one automated action comprises automatically training at least a portion of the one or more machine learning techniques using feedback associated with at least a portion of the one or more determined times;
wherein the method is performed by at least one processing device comprising a processor coupled to a memory.

2. The computer-implemented method of claim 1, wherein performing the at least one automated action comprises automating statistics gathering associated with the at least one storage object in accordance with the one or more determined times.

3. The computer-implemented method of claim 1, wherein determining the one or more times to gather statistics comprises dynamically identifying a percentage of stale data for the at least one storage object.

4. The computer-implemented method of claim 3, wherein dynamically identifying the percentage of stale data comprises predicting an amount of activity data on the at least one storage object for a future time period of a given length, and normalizing the predicted amount of activity data by performing machine learning-based feature scaling on the predicted amount of activity data using one or more min-max normalization techniques.

5. The computer-implemented method of claim 4, wherein dynamically identifying the percentage of stale data further comprises determining a percentage change of the normalized predicted amount of activity data relative to a total amount of activity data having previously occurred on the at least one storage object for a past time period of the given length, and dynamically identifying the percentage of stale data based at least in part on the determined percentage change and the normalized predicted amount of activity data.

6. The computer-implemented method of claim 1, wherein obtaining activity data comprises obtaining data pertaining to data manipulation language activity on the at least one storage object of the given database.

7. The computer-implemented method of claim 1, wherein the one or more machine learning techniques comprise at least one of one or more time series forecasting models, and an autoregressive integrated moving average model.

8. The computer-implemented method of claim 1, wherein processing at least a portion of the obtained activity data using one or more machine learning techniques comprises processing the at least a portion of the obtained activity data using an autoregressive integrated moving average model which includes one or more features comprising timestamp values and one or more labels comprising number of activity data items, and wherein using the autoregressive integrated moving average model comprises using past numbers of activity data items considered in accordance with the timestamp values as a testing dataset, and forecasting a number of activity data items for at least one future time period in accordance with the timestamp values, said forecasting based at least in part on one or more types of activity associated with the activity data items for the at least one storage object.

9. The computer-implemented method of claim 1, wherein processing the at least a portion of the obtained activity data is based at least in part on size of the at least one storage object and activity data pertaining to the at least one storage object relative to one or more additional storage objects.

10. The computer-implemented method of claim 1, wherein performing the at least one automated action comprises outputting the one or more determined times to at least one optimizer component associated with the given database for use in execution planning in connection with one or more programming language queries.

11. A non-transitory processor-readable storage medium having stored therein program code of one or more software programs, wherein the program code when executed by at least one processing device causes the at least one processing device:
to obtain activity data pertaining to at least one storage object of a given database;
to determine one or more times to gather statistics related to activity data pertaining to the at least one storage object of the given database by processing at least a portion of the obtained activity data using one or more machine learning techniques; and
to perform at least one automated action related to statistics gathering based at least in part on the one or more determined times, wherein performing at least one automated action comprises automatically training at least a portion of the one or more machine learning techniques using feedback associated with at least a portion of the one or more determined times.

12. The non-transitory processor-readable storage medium of claim 11, wherein performing the at least one automated action comprises automating statistics gathering associated with the at least one storage object in accordance with the one or more determined times.

13. The non-transitory processor-readable storage medium of claim 11, wherein determining the one or more times to gather statistics comprises dynamically identifying a percentage of stale data for the at least one storage object.

14. The non-transitory processor-readable storage medium of claim 11, wherein obtaining activity data comprises obtaining data pertaining to data manipulation language activity on the at least one storage object of the given database.

15. The non-transitory processor-readable storage medium of claim 11, wherein processing at least a portion of the obtained activity data using one or more machine learning techniques comprises processing the at least a portion of the obtained activity data using an autoregressive integrated moving average model which includes one or more features comprising timestamp values and one or more labels comprising number of activity data items, and wherein using the autoregressive integrated moving average model comprises using past numbers of activity data items considered in accordance with the timestamp values as a testing dataset, and forecasting a number of activity data items for at least one future time period in accordance with the timestamp values, said forecasting based at least in part on one or more types of activity associated with the activity data items for the at least one storage object.

16. An apparatus comprising:
at least one processing device comprising a processor coupled to a memory;
the at least one processing device being configured:
to obtain activity data pertaining to at least one storage object of a given database;
to determine one or more times to gather statistics related to activity data pertaining to the at least one storage object of the given database by processing at least a portion of the obtained activity data using one or more machine learning techniques; and
to perform at least one automated action related to statistics gathering based at least in part on the one or more determined times, wherein performing at least one automated action comprises automatically training at least a portion of the one or more machine learning techniques using feedback associated with at least a portion of the one or more determined times.

17. The apparatus of claim 16, wherein performing the at least one automated action comprises automating statistics gathering associated with the at least one storage object in accordance with the one or more determined times.

18. The apparatus of claim 16, wherein determining the one or more times to gather statistics comprises dynamically identifying a percentage of stale data for the at least one storage object.

19. The apparatus of claim 16, wherein obtaining activity data comprises obtaining data pertaining to data manipulation language activity on the at least one storage object of the given database.

20. The apparatus of claim 16, wherein processing at least a portion of the obtained activity data using one or more machine learning techniques comprises processing the at least a portion of the obtained activity data using an autoregressive integrated moving average model which includes one or more features comprising timestamp values and one or more labels comprising number of activity data items, and wherein using the autoregressive integrated moving average model comprises using past numbers of activity data items considered in accordance with the timestamp values as a testing dataset, and forecasting a number of activity data items for at least one future time period in accordance with the timestamp values, said forecasting based at least in part on one or more types of activity associated with the activity data items for the at least one storage object.

* * * * *